US012722393B2

(12) United States Patent
Yoshida et al.

(10) Patent No.: US 12,722,393 B2
(45) Date of Patent: Sep. 1, 2026

(54) DEGASSING DEVICE AND INKJET RECORDING APPARATUS

(71) Applicant: KYOCERA Document Solutions Inc., Osaka (JP)

(72) Inventors: Takeru Yoshida, Osaka (JP); Takeshi Watanabe, Osaka (JP); Yoshihiro Yamagishi, Osaka (JP); Hideki Ishida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 218 days.

(21) Appl. No.: 18/810,316

(22) Filed: Aug. 20, 2024

(65) Prior Publication Data

US 2026/0054494 A1 Feb. 26, 2026

(51) Int. Cl.
*B41J 2/19* (2006.01)
*B41J 2/175* (2006.01)

(52) U.S. Cl.
CPC ............. *B41J 2/19* (2013.01); *B41J 2/17596* (2013.01)

(58) Field of Classification Search
CPC ........... B41J 2/19; B41J 2/17596; B41J 2/175
See application file for complete search history.

(56) References Cited

U.S. PATENT DOCUMENTS

2019/0263135 A1* 8/2019 Abe ......................... B41J 29/38

FOREIGN PATENT DOCUMENTS

JP 2010-162821 A 7/2010
JP 2019-142189 A 8/2019

* cited by examiner

*Primary Examiner* — Bradley W Thies
(74) *Attorney, Agent, or Firm* — Studebaker Brackett PLLC

(57) ABSTRACT

A degassing device removes air dissolved in liquid under a pressure decreased atmosphere. The degassing device includes a liquid tank, a pressure decreasing device, a circulation flow pass, and a circulation device. The liquid tank stores the liquid. The pressure decreasing device decreases pressure in the liquid tank. The circulation flow pass communicates different positions of the liquid tank. The circulation device circulates the liquid through the circulation flow pass. The circulation flow pass includes an outlet port from the liquid tank to the circulation flow pass, and an inlet port from the circulation flow pass to the liquid tank below a liquid surface. A diameter of the inlet port is smaller than a diameter of the outlet port.

5 Claims, 7 Drawing Sheets

DEGASSING DEVICE AND INKJET RECORDING APPARATUS

BACKGROUND

The present disclosure relates to a degassing device and an inkjet recording apparatus.

In an inkjet recording apparatus, when an amount of dissolved gas of ink increases, bubbles may be generated inside a recording head, causing an ejection failure. Therefore, a technique for decreasing an amount of the dissolved gas in the ink has been studied. For example, there has been proposed a configuration in which the ink in the ink tank is stirred in a state where a pressure inside an ink tank is decreased.

In the above degassing device, the ink in the ink tank is stirred, and the ink is degassed near the liquid surface. However, since the stirrer is located at the bottom of the ink tank, when the ink capacity increases, it becomes difficult to replace the ink near the liquid surface where the amount of dissolved air is small with the ink near the bottom surface where the amount of dissolved air is large, and the degassing efficiency is lowered.

SUMMARY

A degassing device according to the present disclosure removes air dissolved in liquid under a pressure decreased atmosphere. The degassing device includes a liquid tank, a pressure decreasing device, a circulation flow pass, and a circulation device. The liquid tank stores the liquid. The pressure decreasing device decreases pressure in the liquid tank. The circulation flow pass communicates different positions of the liquid tank. The circulation device circulates the liquid through the circulation flow pass. The circulation flow pass includes an outlet port from the liquid tank to the circulation flow pass, and an inlet port from the circulation flow pass to the liquid tank below a liquid surface. A diameter of the inlet port is smaller than a diameter of the outlet port.

An inkjet recording apparatus according to the present disclosure includes the degassing device, and a recording head which ejects the liquid degassed by the degassing device, to a sheet.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
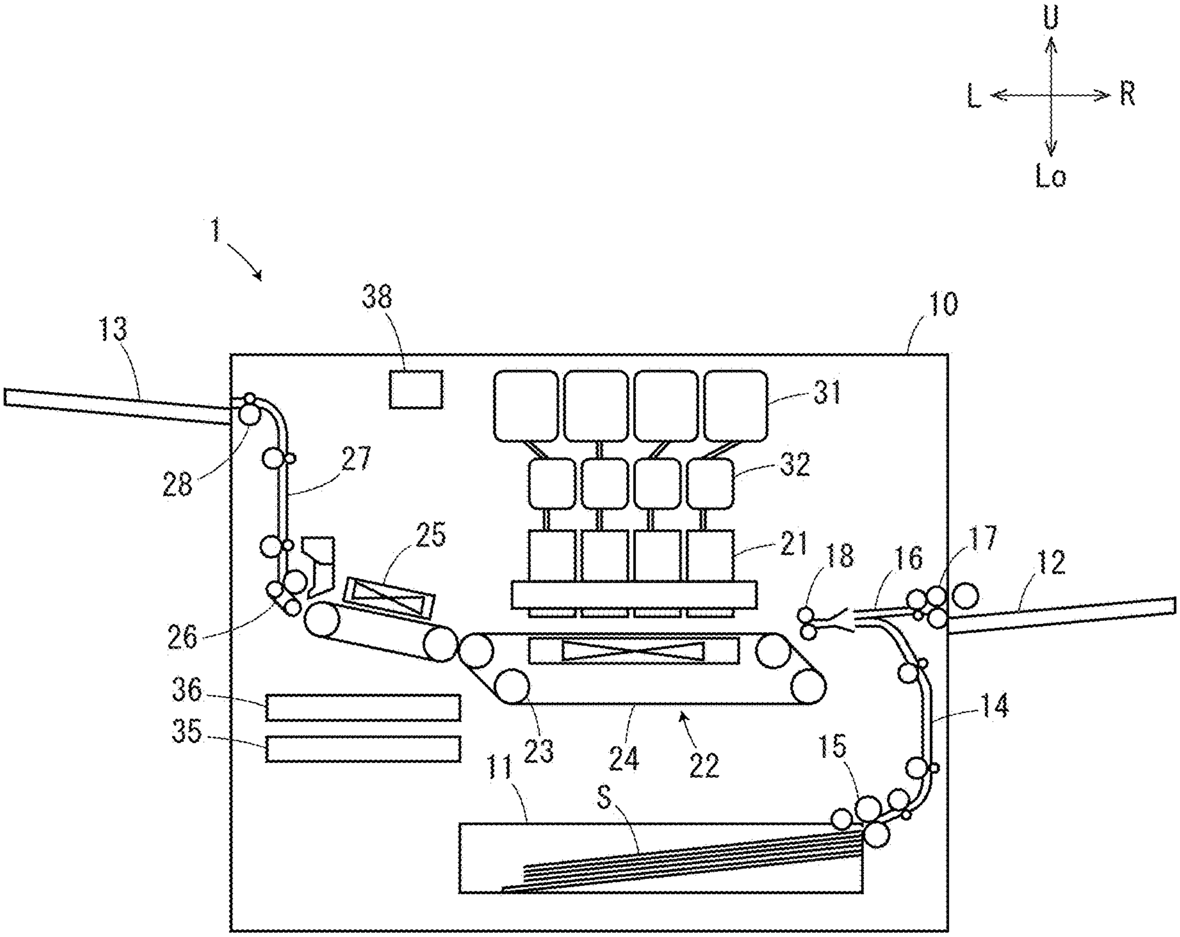
FIG. 1 is a schematic view showing an inkjet recording apparatus according to one embodiment of the present disclosure.

Hereinafter, with reference to the drawings, an inkjet recording apparatus 1 of the present embodiment will be described. FIG. 1 is a schematic view showing the inkjet recording apparatus 1 according to the present embodiment. For convenience of explanation, the front side of the paper surface on which FIG. 1 is drawn is defined as the front side of the inkjet recording apparatus 1, and the left-and-right direction will be described with reference to the direction in which the inkjet recording apparatus 1 is viewed from the front side. The arrows L, R, U, and Lo attached to each figure indicate the left, right, upper, and lower sides of the inkjet recording apparatus 1, respectively.

An inkjet recording apparatus 1 ejects ink from each inkjet recording head 21 toward a sheet S as a recording medium and performs printing. The inkjet recording apparatus 1 includes a box-shaped housing 10 in which various kinds of device are housed. In the lower portion of the housing 10, a sheet feeding cassette 11 in which the sheet S is set is housed, and a manual sheet feeding tray 12 on which the sheet S is set by hand is installed on the right side surface of the housing 10. On the upper portion of the left side surface of the housing 10, a sheet discharge tray 13 on which the recorded sheet S is stacked is installed.

In the right side portion in the housing 10, a first conveyance path 14 along which the sheet S is conveyed from the sheet feeding cassette 11 to the recording head 21 provided in the center of the housing 10 is formed. On the upstream side of the first conveyance path 14, a first sheet feeding part 15 which feeds the sheet S from the sheet bundle in the sheet feeding cassette 11 is provided, and a registration roller 18 which adjusts the feeding timing of the sheet S is provided in the downstream portion of the first conveyance path 14. Further, a sheet feeding path 16 of the manual sheet feeding tray 12 is merged with the downstream portion of the first conveyance path 14, and a second sheet feeding part 17 which feeds the sheet S from the sheet bundle on the manual sheet feeding tray 12 is provided on the sheet feeding path 16.

On the downstream side of the registration roller 18, a conveying device 22 and the recording head 21 provided for each color (for example, black, cyan, magenta, and yellow) are installed. The registration roller 18 corrects the skew of the sheet S and then sends the sheet S to the conveying device 22 in accordance with the ink ejecting operation by each recording head 21. In the housing 10, an ink container 31 and an ink tank 32 for each recording head 21 are provided. The ink of each ink container 31 is temporarily stored in the ink tank 32, the ink is degassed as necessary, and then the ink is supplied from the ink tank 32 to the recording head 21.

The conveying device 22 is constituted by winding a conveyance belt 24 around a plurality of tension rollers 23 installed below the recording heads 21. On the downstream side of the conveying device 22, a drying device 25 which dries the ink of the sheet S is provided. On the downstream side of the drying device 25, a decurl device 26 which corrects the curl generated on the sheet S by drying the ink is provided. On the downstream side of the decurl device 26, a second conveyance path 27 along which the sheet S is conveyed toward the sheet discharge tray 13 is formed. In the downstream portion of the second conveyance path 27, a sheet discharge part 28 which discharges the recorded sheet S to the sheet discharge tray 13 is provided.

Below the drying device 25, a maintenance unit 35 which cleans the recording heads 21 and a cap unit 36 which caps the recording heads 21 are provided. The maintenance unit 35 is provided with a squeegee-shaped wiping blade, and the wiping blade scrapes the ink remaining on the nozzle surface of the recording head 21. The cap unit 36 is provided with a head cap, and the nozzle surface of the recording head 21 is capped with the head cap. The head cap suppresses drying of the ink in the nozzle. The drying of the ink in the nozzle may be further suppressed by storing a liquid such as a cleaning liquid in the head cap.

Further, the inkjet recording apparatus 1 is provided with a control device 38 for controlling the entire apparatus. The control device 38 may be composed of a processor or a logic circuit (hardware) formed in an integrated circuit or the like. In the case of a processor, the processor reads and executes a program stored in a memory, and various processes are executed. For example, a CPU (Central Processing Unit) is used as the processor. The memory is constituted by one or more storage devices such as a ROM (Read Only Memory), a RAM (Random Access Memory) or the like depending on the application.

At the time of image recording, the sheet S is fed from the sheet feeding cassette 11 and the manual sheet feeding tray 12 by the first sheet feeding part 15 and the second sheet feeding part 17, respectively, and then sent to the registration roller 18. In accordance with the ejecting timing of the ink, the sheet S is conveyed from the registration roller 18 to the conveyance belt 24, the degassed ink is ejected from each recording head 21, and a color image is recorded on the surface of the sheet S. The sheet S is dried by the drying device 25, and the curl of the sheet S is corrected by the decurl device 26. The sheet S is conveyed to the sheet discharge part 28 through the second conveyance path 27, and the recorded sheet S is discharged to the sheet discharge tray 13 by the sheet discharge part 28.

By the way, the liquid surface of the ink is exposed to the air in the ink tank 32, and the dissolving of the air proceeds, and the nozzle of the recording head 21 may be clogged by bubbles in the ink. Therefore, it is desired to appropriately keep an amount of dissolved gas in the ink. For example, a method has been proposed in which by passing the ink through a hollow fiber filter in a state where the pressure of the circumference of the hollow fiber filter is decreased, the air is moved from the wall surface of the hollow fiber to the pressure decreased side to degas the ink. This method requires the expensive hollow fiber filter and requires periodic replacement operations, which increase cost.

In order to prevent the clogging of the nozzle, a method (hereinafter referred to as the stirring degassing method) has been proposed in which the ink is stirred by the stirrer in a state in which the pressure in the ink tank 32 is decreased below an atmospheric pressure to degas the ink. In the stirring degassing method, a magnetic force is externally applied to the stirrer in the ink tank 32, and the stirrer is rotated by the magnetic force to stir the ink in the ink tank 32. When the depth of the ink and the tank diameter are large, the ink is difficult to be stirred, and the degassing efficiency is lowered. As the rotational speed of the stirrer is increased, the stirring becomes easier, but when the rotational speed of the stirrer becomes too high, a detuning phenomenon occurs and the rotational sound of the stirrer becomes large. Therefore, in the present embodiment, a circulation degassing method shown below is adopted.

Figure 2:
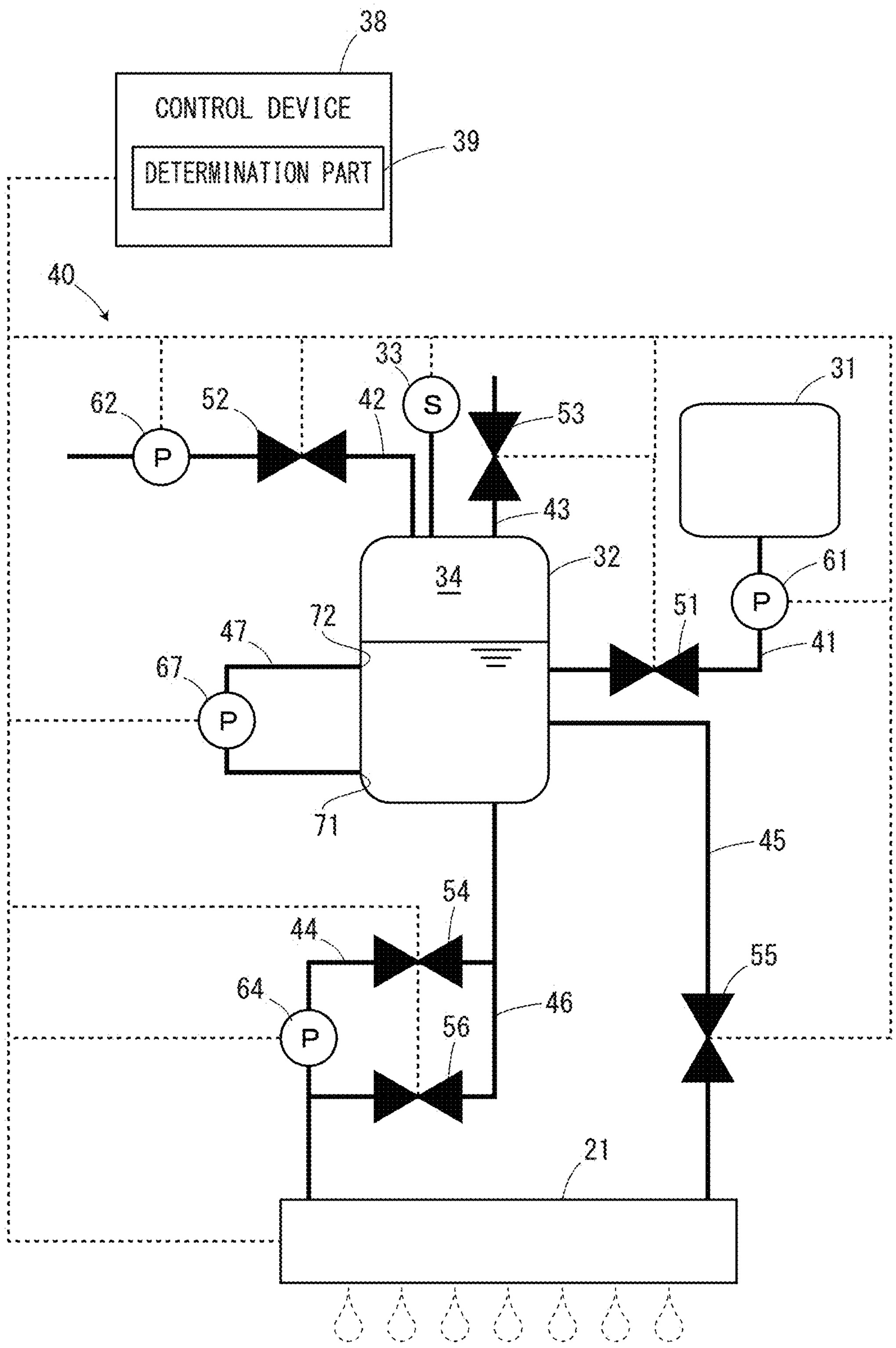
FIG. 2 is a schematic view showing an ink supply configuration according to the embodiment of the present disclosure.
Figure 3:
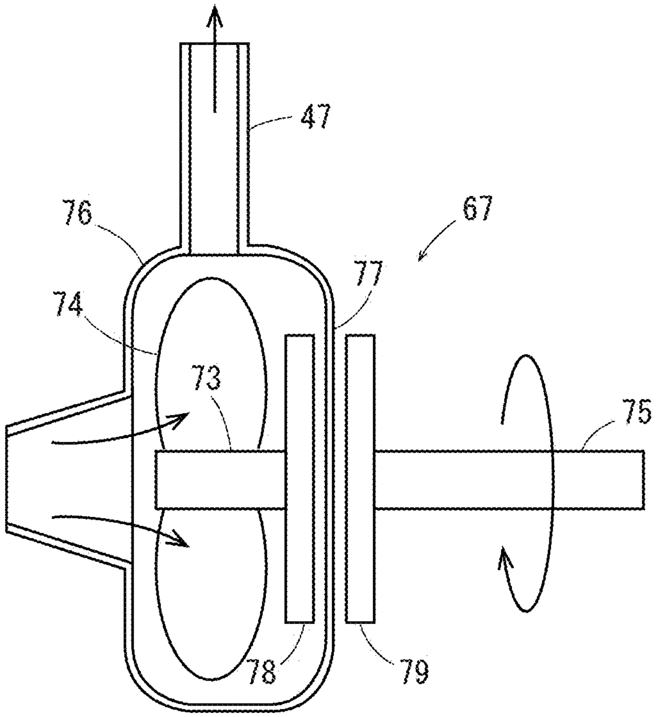
FIG. 3 is a schematic view showing a circulation pump according to the embodiment of the present disclosure.
Figure 4:
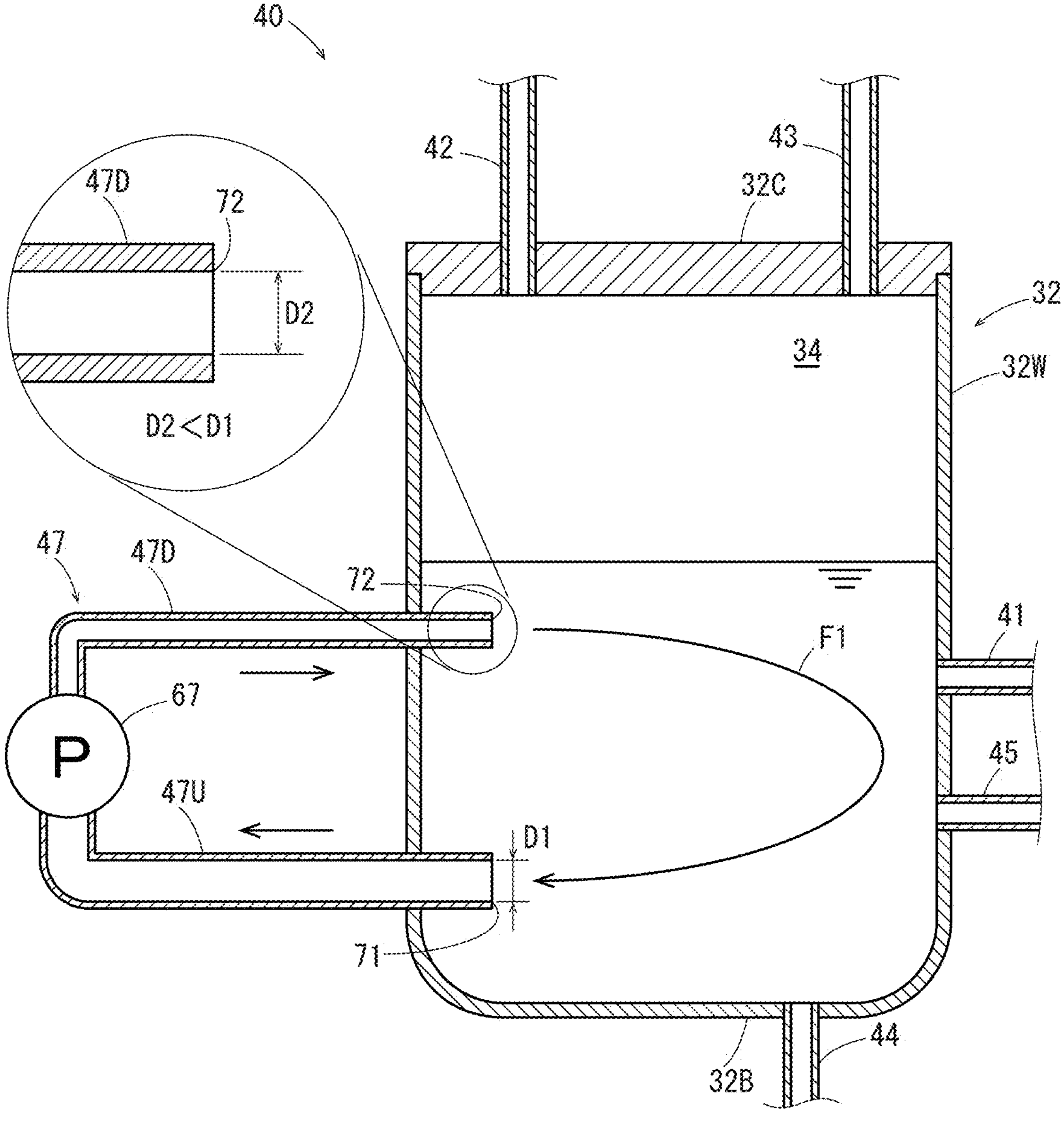
FIG. 4 is a sectional view schematically showing a degassing device according to the embodiment of the present disclosure.

[Degassing Device] A degassing device 40 according to this embodiment will be described. FIG. 2 is a schematic diagram showing an ink supply configuration according to the present embodiment. FIG. 3 is a schematic view showing a circulation pump 67 according to the present embodiment. FIG. 4 is a sectional view schematically showing the degassing device 40. Although the inkjet recording apparatus 1 according to the present embodiment is provided with the ink supply configuration for each color of the ink, one ink supply configuration will be described here because these ink supply configurations have the same structure.

[Ink Tank] The ink tank 32 has a cylindrical side wall portion 32W whose axial direction is along the upper-and-lower direction, a bottom portion 32B for closing the lower end portion of the side wall portion 32W, and a lid body portion 32C for closing the upper end portion of the side wall portion 32W. The horizontal cross section of the inner surface of the side wall portion 32W is preferably circular. Preferably, the side wall portion 32W and the bottom portion 32B are integrally formed.

[Replenishment Flow Pass] A replenishment flow pass 41 communicates with the ink container 31 and the ink tank 32. One end portion of the replenishment flow pass 41 is connected to the side wall portion 32W of the ink tank 32 below the liquid surface. On the replenishment flow pass 41, a replenishment pump 61 and a replenishment valve 51 are provided.

[Air Release Flow Pass] An air release flow pass 43 is connected to the lid body portion 32C, and communicates with the upper space 34 of the ink tank 32. On the air release flow pass 43, an air release valve 53 is provided.

[Pressure Decreasing Flow Pass] A pressure decreasing flow pass 42 is connected to the lid body portion 32C, and communicates with the upper space 34 of the ink tank 32. On the pressure decreasing flow pass 42, a pressure decreasing pump 62 and a pressure decreasing valve 52 are provided.

[Supply Flow Pass] A supply flow pass 44 communicates with the ink tank 32 and the recording head 21. One end portion of the supply flow pass 44 is connected to the bottom portion 32B of the ink tank 32. On the supply flow pass 44, a supply valve 54 and a supply pump 64 are provided.

[Recovery Flow Pass] A recovery flow pass 45 communicates with the ink tank 32 and the recording head 21. One end portion of the recovery flow pass 45 is connected to the side wall portion 32W of the ink tank 32. On the recovery flow pass 45, a recovery valve 55 is provided.

[Bypass Flow Pass] The supply flow pass 44 includes a bypass flow pass 46 bypassing the supply valve 54 and the supply pump 64. On the bypass flow pass 46, a bypass valve 56 is provided.

[Circulation Flow Pass] A circulation flow pass communicates with the vicinity of the bottom surface of the ink of the ink tank 32 and the vicinity of the liquid surface. The circulation flow pass 47 has an outlet port 71 through which the ink flows out from the ink tank 32 into the circulation flow pass 47, and an inlet port 72 through which the ink flows in from the circulation flow pass 47 into the ink tank 32. The outlet port 71 is connected to the side wall portion 32W of the ink tank 32 at a position closer to the bottom portion 32B, and the inlet port 72 is connected to the side wall portion 32W of the ink tank 32 at a position near the liquid surface. That is, the inlet port 72 is positioned higher than the outlet port 71. On the circulation flow pass 47, a circulation pump 67 is provided. The ink is circulated via the circulation flow pass 47 by the circulation pump 67. The outlet port 71 may be connected to the bottom portion 32B of the ink tank 32.

[Circulation Pump] Since the inside of the ink tank 32 is in a pressure decreased state during the degassing operation, a reciprocating pump such as a diaphragm type pump is easily affected by the decreased pressure. Therefore, it is preferable that the circulation pump 67 uses a pump that pumps the ink by a rotating body. For example, as the circulation pump 67, a non-positive displacement pump such as a centrifugal pump, an oblique flow pump, and an axial flow pump, or a positive displacement rotary pump such as a vane pump, a gear pump, or a screw pump may be used. By using these pumps, unlike the reciprocating pump, the influence of pressure decreasing in the ink tank 32 can be suppressed to circulate the ink.

In general, the recording head 21 may be included in the circulation flow pass 47 of the circulation degassing method, but in the present embodiment, the recording head 21 is not included in the circulation flow pass 47. That is, the circulation flow pass 47 is provided separately from the pass for supplying the ink to the recording head 21. Since the recording head 21 is not included in the circulation flow pass 47, the possibility that the meniscus formed in the nozzle of the recording head 21 is broken by the decreased pressure during the degassing and the outside air enters the recording head 21 can be reduced.

As shown in FIG. 3, a pump shaft 73 of the circulation pump 67 and a motor shaft 75 are disposed on both sides of a partition wall 77 so that power can be transmitted without contact. A pump casing 76 is formed in the middle of the circulation flow pass 47, and the pump shaft 73 attached with an impeller 74 is housed in the pump casing 76. A motor (not shown) is provided outside the circulation flow pass 47. Discs 78 and 79 are provided at the end portions of the pump shaft 73 and the motor shaft 75, and the discs 78 and 79 face each other across the partition wall 77 of the pump casing 76. Magnets (not shown) in which the S and N poles are alternately arranged in the circumferential direction are provided on opposite surfaces of the discs 78 and 79.

The pump shaft 73 and the motor shaft 75 are magnetically coupled (magnet coupling), and the power is transmitted from the motor shaft 75 to the pump shaft 73 using the magnetic force. The impeller 74 in the pump casing 76 can be rotated without penetrating the motor shaft 75 through the pump casing 76 while the pump casing 76 is kept in a liquid-tightly sealed state. Since the space between the discs 78 and 79 of the pump shaft 73 and the motor shaft 75 is partitioned by the partition wall 77 of the pump casing 76, even if a pressure difference between the inside and the outside of the pump casing 76 occurs when the pressure of the ink tank 32 is decreased, the ink leakage caused by the pressure difference is surely prevented.

[Control Device] the Replenishment Pump 61, the pressure decreasing pump 62, the supply pump 64, the circulation pump 67, the replenishment valve 51, the pressure decreasing valve 52, the air release valve 53, the supply valve 54, the recovery valve 55, and the bypass valve 56 are controlled by the control device 38. The control device 38 includes a determination part 39 which determines the necessity of the degassing operation in accordance with a leaving time of the ink. When the determination part 39 determines that degassing of the ink is unnecessary, the degassing operation is not performed. Even if the air is dissolved again by leaving the ink, the ink can be used without the degassing within the allowable time.

[Barometer] The ink tank 32 is provided with a barometer 33 which measures an atmospheric pressure in the upper space 34 of the ink tank 32. The control device 38 acquires atmospheric pressure data from the barometer 33.

Next, the basic operation of the degassing device 40 will be described. Here, the standby state will be described as an initial state.

[Standby State] In the standby state, the replenishment valve 51, the pressure decreasing valve 52, and the supply valve 54 are closed, and the air release valve 53, the recovery valve 55, and the bypass valve 56 are opened. The ink is stored in the ink tank 32, the liquid surface is exposed to the air in the upper space 34 opened to the atmosphere, and then the air is dissolved in the ink with the lapse of time.

In the Standby State, the Determination Part 39 of the control device 38 determines whether the degassing is necessary. For example, the control device 38 is provided with a timer, and the leaving time of the ink is measured by the timer. An amount of dissolved gas of the ink can be estimated from one or more parameters such as an atmospheric pressure, a temperature of the ink, and an elapsed time from the last printing. Therefore, the determination part 39 stores conversion information indicating a correspondence relationship between each parameter and the amount of dissolved gas of the ink, and estimates the amount of dissolved gas of the ink based on each parameter. In addition, the determination part 39 stores conversion information indicating a correspondence relationship between the amount of dissolved gas of the ink and the allowable time, and the allowable time is set based on the amount of dissolved gas of the ink. The allowable time is a time during which the printing is allowed without degassing even if the ink is left. For the conversion information indicating the correspondence relationship between each parameter and the amount of dissolved gas of the ink and the conversion information indicating the correspondence relationship between the amount of dissolved gas of the ink and the allowable time, map data, a lookup table, a conversion equation, and the like are used. These map data, lookup table, and conversion equation are obtained experimentally, empirically, and theoretically in advance.

When the leaving time of the ink is within the allowable time, the determination part 39 determines that the degassing is unnecessary because an oxygen saturation degree is low. When the leaving time of the ink exceeds the allowable time, the determination part 39 determines that the degassing is necessary because the oxygen saturation degree is high. If the degassing is necessary, the control device 38 performs the pressure decreasing process and the degassing process described below.

[Pressure Decreasing Process] In the pressure decreasing process, the control device 38 closes the replenishment valve 51, the air release valve 53, the supply valve 54, the recovery valve 55, and the bypass valve 56, opens the pressure decreasing valve 52, and drives the pressure decreasing pump 62. Then, the air is sucked out from the upper space 34 of the ink tank 32, and the upper space 34 is decreased in pressure. The control device 38 stops the pressure decreasing pump 62 when the atmospheric pressure in the upper space 34 indicated by the barometer 33 reaches a target value (for example, −50 [kPa]).

[Degassing Process] When the pressure decreasing process is completed, the control device 38 performs the degassing process. In the degassing process, the control device 38 closes the replenishment valve 51, the pressure decreasing valve 52, the air release valve 53, the supply valve 54, the recovery valve 55, and the bypass valve 56, and drives the circulation pump 67 for a predetermined period. When the circulation pump 67 is driven, the ink in the ink tank 32 circulates through the circulation flow pass 47. The ink near the bottom surface of the ink tank 32 having a large amount of dissolved air flows out into the circulation flow pass 47 through the outlet port 71, and the ink in the circulation flow pass 47 flows into the vicinity of the liquid surface in the ink tank 32 through the inlet port 72. The liquid surface of the ink is exposed to the pressure decreased atmosphere to remove the air dissolved in the ink near the liquid surface. By smoothly replacing the ink near the liquid surface having a small amount of dissolved air with the ink near the bottom surface having a large amount of dissolved air, the degassing efficiency is improved. In addition, unlike the stirring degassing method, the depth of the ink and the tank diameter are not affected, and the driving sound of the circulation pump 67 is suppressed rather than the rotating sound of the stirrer, and the quietness is enhanced.

[Head Circulation Process] The head circulation process may be performed before or after the degassing process and may be performed at a unique timing. In the head circulation process, the control device 38 closes the replenishment valve 51, and the bypass valve 56, opens the air release valve 53, the supply valve 54, and the recovery valve 55, and drives the supply pump 64. Then, the ink is supplied from the ink tank 32 to the recording head 21 through the supply flow pass 44, and the ink is recovered from the recording head 21 to the ink tank 32 through the recovery flow pass 45. By circulating the ink between the recording head 21 and the ink tank 32, the ink with increased viscosity is replaced in the recording head 21 and bubbles are removed from the recording head 21.

[Print Process] In the printing operation by the recording head 21, the replenishment valve 51, the pressure decreasing valve 52 and the supply valve 54 are closed, and the air release valve 53, the recovery valve 55, and the bypass valve 56 are opened. That is, at the printing operation, the ink tank 32 is released to atmospheric pressure. During the printing operation, the ink tank 32 is not decreased in pressure such that substantial degassing occurs. Every time when the ink is ejected from the recording head 21, the ink is supplied from the ink tank 32 to the recording head 21 through the bypass flow pass 46 and the recovery flow pass 45. In some cases, the ink is replenished in the middle of the ink replacement operation, the printing operation, and the like. During the ink replenishment operation, the replenishment valve 51 is opened and the replenishment pump 61 is driven. The ink is replenished from the ink container 31 to the ink tank 32 through the replenishment flow pass 41 by driving the replenishment pump 61.

FIG. 1 and the others are schematically drawn, and the recording head 21 is actually disposed above the ink tank 32. A negative pressure is applied to the ink in the recording head 21 by a head difference from the ink in the ink tank 32, and a meniscus is formed in the nozzle of the recording head 21 by the negative pressure. After the ink is ejected from the recording head 21, the surface tension of the ink acts to reduce the surface area of the meniscus, and the resulting negative pressure draws the reduced amount of the ink from the ink tank 32 into the recording head 21. The recovery valve 55 may be closed to supply the ink to the recording head 21 only from the bypass flow pass 46.

If the ink tank 32 is decreased in pressure to the extent that substantial degassing occurs in a state where the recording head 21 and the ink tank 32 are connected, the meniscus of the nozzle may be destroyed. Even if the meniscus is not destroyed, there is a risk that the shape of the meniscus in the nozzle changes from that when the ink tank 32 is released from the atmosphere, and the ejection characteristics of the ink may be changed. In the present embodiment, since the ink tank 32 is not decreased in pressure so as to cause the substantial degassing during the printing operation, the meniscus in the nozzle of the recording head 21 is not destroyed, and the shape is not changed and the ejection characteristic is not changed.

Next, the features of this embodiment will be described in detail. The degassing device 40 according to the present embodiment removes the air dissolved in a liquid (for example, the ink) under a pressure decreased atmosphere, and includes the liquid tank (for example, the ink tank 32), the pressure decreasing device (for example, the pressure decreasing pump 62), the circulation flow pass 47, and the circulation device (for example, the circulation pump 67). The liquid tank stores the liquid. The pressure decreasing device decreases the pressure of the inside of the liquid tank. The circulation flow pass 47 communicates different positions of the liquid tank. The circulation device circulates the liquid through the circulation flow pass 47. The circulation flow pass 47 includes an outlet port 71 from the liquid tank to the circulation flow pass 47 and an inlet port 72 from the circulation flow pass 47 to the liquid tank below the liquid surface, and the diameter D2 of the inlet port 72 is smaller than the diameter D1 of the outlet port 71. Specifically, they are as follows. Since the ink tank 32, the pressure decreasing pump 62, and the circulation pump 67 are as described above, the circulation flow pass 47 will be mainly described below.

As described above, the outlet port 71 is connected to the side wall portion 32W of the ink tank 32 at a portion closer to the bottom portion 32B, and the inlet port 72 is connected to the side wall portion 32W of the ink tank 32 at a portion near the liquid surface. The circulation flow pass 47 includes an upstream side flow pass 47U from the outlet port 71 to the circulation pump 67, and a downstream side flow pass 47D from the circulation pump 67 to the inlet port 72. The diameter of the upstream side flow pass 47U is equal to the diameter D1 of the outlet port 71 over the entire area. The diameter of the downstream side flow pass 47D is equal to the diameter D2 of the inlet port 72 over the entire area. In other words, the diameter D2 of the downstream side flow pass 47D is smaller than the diameter D1 of the upstream side flow pass 47U.

Figure 5:
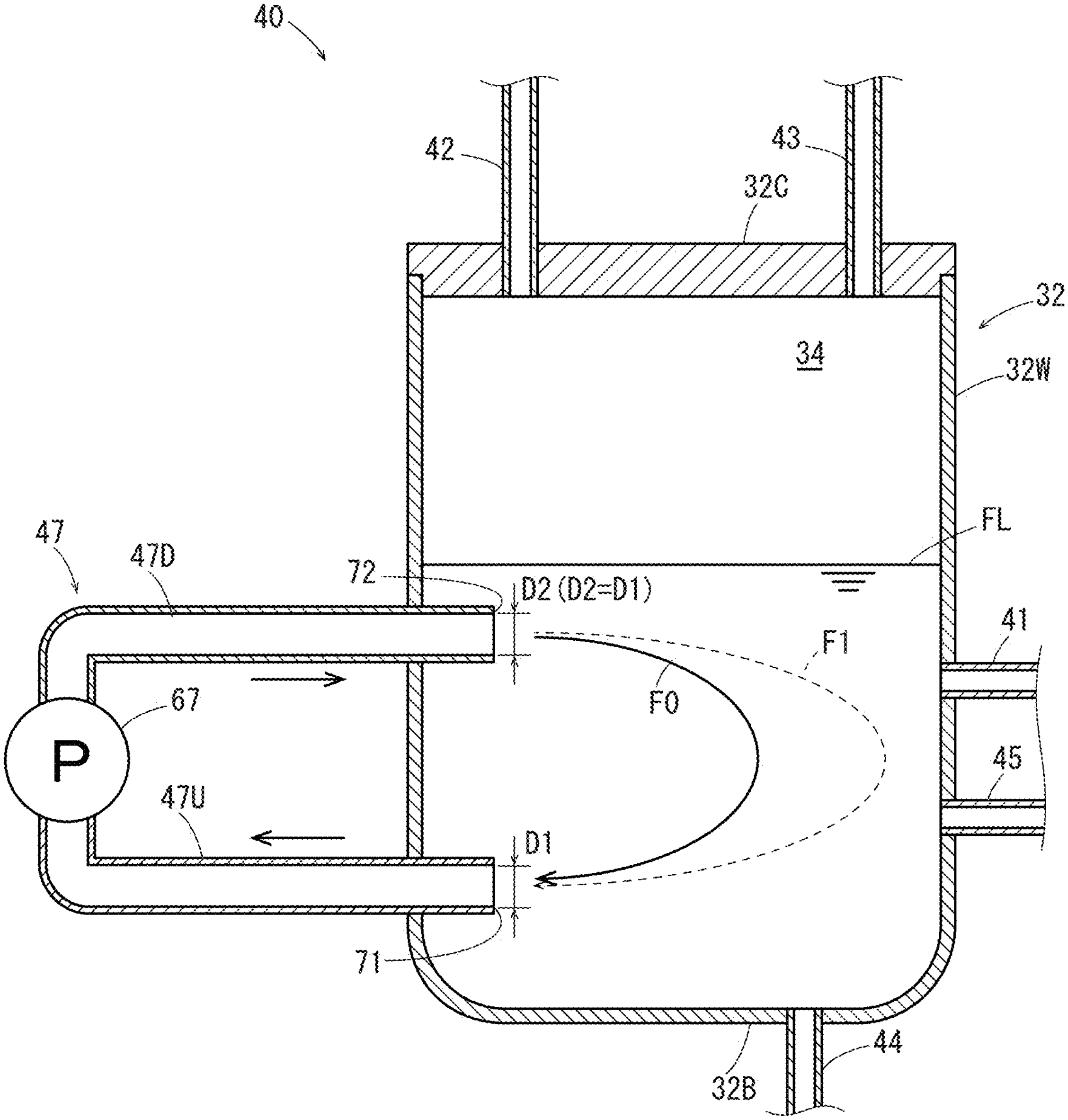
FIG. 5 is a sectional view showing a comparative example.

The ink is sucked from the outlet port 71 and flows into the ink tank 32 below the liquid surface in the ink tank 32 from the inlet port 72 via the upstream side flow pass 47U and the downstream side flow pass 47D. Here, the difference in the circulation speed depending on the size of the inlet port 72 will be considered. FIG. 5 is a cross-sectional view showing a comparative example. In the comparative example, the diameter D2 of the inlet port 72 is equal to the diameter D1 of the outlet port 71. On the other hand, in the present embodiment, the diameter D2 of the inlet port 72 is smaller than the diameter D1 of the outlet port 71.

Comparing the liquid flow F0 from the inlet port 72 to the outlet port 71 in the comparative example with the liquid flow F1 from the inlet port 72 to the outlet port 71 in the present embodiment, the flow F1 is formed along a larger arc than that of the flow F0 because the inflow velocity from the inlet port 72 is faster than that of the flow F0. Therefore, in the present embodiment, the ink having a large amount of dissolved air sucked from the outlet port 71 can be exposed to air on the liquid surface in a wider range than in the comparative example. As a result, the degassing efficiency is improved. Further, according to the present embodiment, since the degassing efficiency can be improved by making the diameter D2 of the inlet port 72 smaller than the diameter D1 of the outlet port 71, it is unnecessary to improve the performance of the circulation pump 67. Therefore, according to the present embodiment, the degassing efficiency can be improved with a simple configuration.

According to the degassing device 40 according to the present embodiment described above, the degassing device 40 removes the air dissolved in the liquid under a pressure decreased atmosphere, and includes the liquid tank (for example, the ink tank 32), the pressure decreasing device (for example, the pressure decreasing pump 62), the circulation flow pass 47, and the circulation device (for example, the circulation pump 67). The liquid tank stores the liquid. The pressure decreasing device decreases the pressure in the inside of the liquid tank. The circulation flow pass 47 communicates different positions of the liquid tank. The circulation device circulates the liquid through the circulation flow pass 47. The circulation flow pass 47 includes the outlet port 71 from the liquid tank to the circulation flow pass 47, and the inlet port 72 from the circulation flow pass 47 to the liquid tank below the liquid surface, and the diameter D2 of the inlet port 72 is smaller than the diameter D1 of the outlet port 71. According to this configuration, the degassing efficiency can be improved by a simple configuration.

According to the degassing device 40 according to the present embodiment, the circulation flow pass 47 includes the upstream side flow pass 47U from the outlet port 71 to the circulation device and the downstream side flow pass 47D from the circulation device to the inlet port 72, and the diameter D2 of the downstream side flow pass 47D is smaller than the diameter D1 of the upstream side flow pass 47U. According to this configuration, since the degassing efficiency can be improved only by using two types of pipes having different diameters, the degassing efficiency can be improved by a simple configuration.

The inkjet recording apparatus 1 according to the present embodiment is provided with the degassing device 40 and the recording head 21 which ejects the liquid degassed by the degassing device 40 to the sheet S. According to this configuration, the deterioration of image quality caused by the generation of bubbles can be suppressed.

The above embodiment may be modified as follows.

[First Modified Example]

Figure 6:
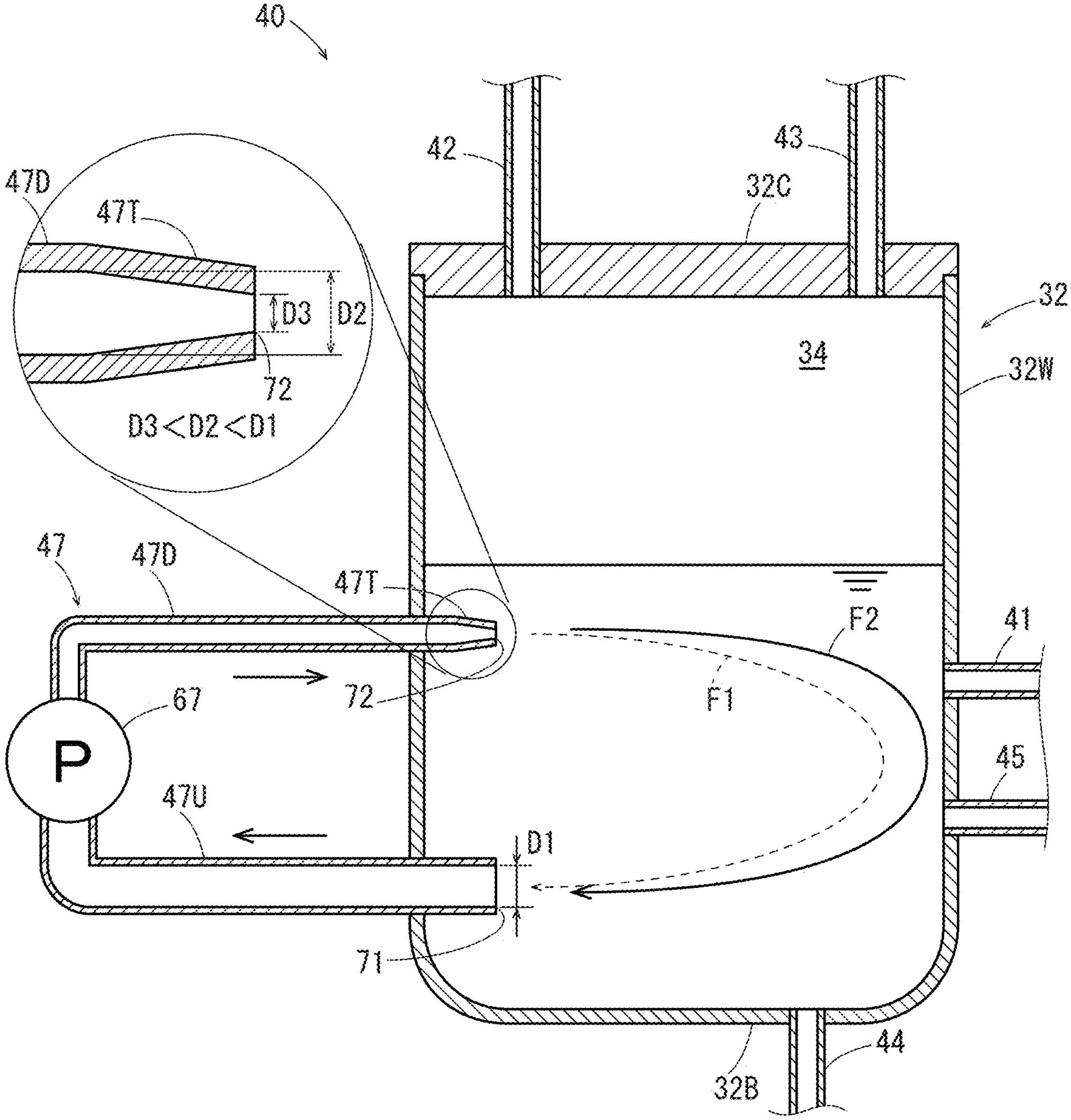
FIG. 6 is a sectional view showing the degassing device according to a first modified example of the embodiment of the present disclosure.

FIG. 6 is a sectional view showing the degassing device 40 according to the first modified example of the above embodiment. In this modified example, the downstream side flow pass 47D includes a tapered portion 47T whose diameter becomes smaller closer to the inlet port 72. Specifically, the tapered portion 47T is provided over a predetermined length including the inlet port 72. The diameter D3 of the inlet port 72, that is, the most downstream portion of the tapered portion 47T is smaller than the diameter D2 of the section on the upstream side of the tapered portion 47T.

By providing the tapered portion 47T to make the inlet port 72 further smaller, since the inflow velocity from the inlet port 72 can be further increased, the liquid flow F2 from the inlet port 72 to the outlet port 71 in the present modified example is formed along a larger arc than the flow F1 in the above embodiment. Therefore, in the present embodiment, the ink having a large amount of dissolved air sucked from the outlet port 71 can be exposed to air on the liquid surface in a wider range than in the above embodiment. As a result, the degassing efficiency is improved. Further, compared with the case where the diameter of the entire downstream side flow pass 47D is set to D3 without providing the tapered portion 47T, the flow resistance becomes small, so that the loss of energy can be suppressed.

[Second Modified Example]

Figure 7:
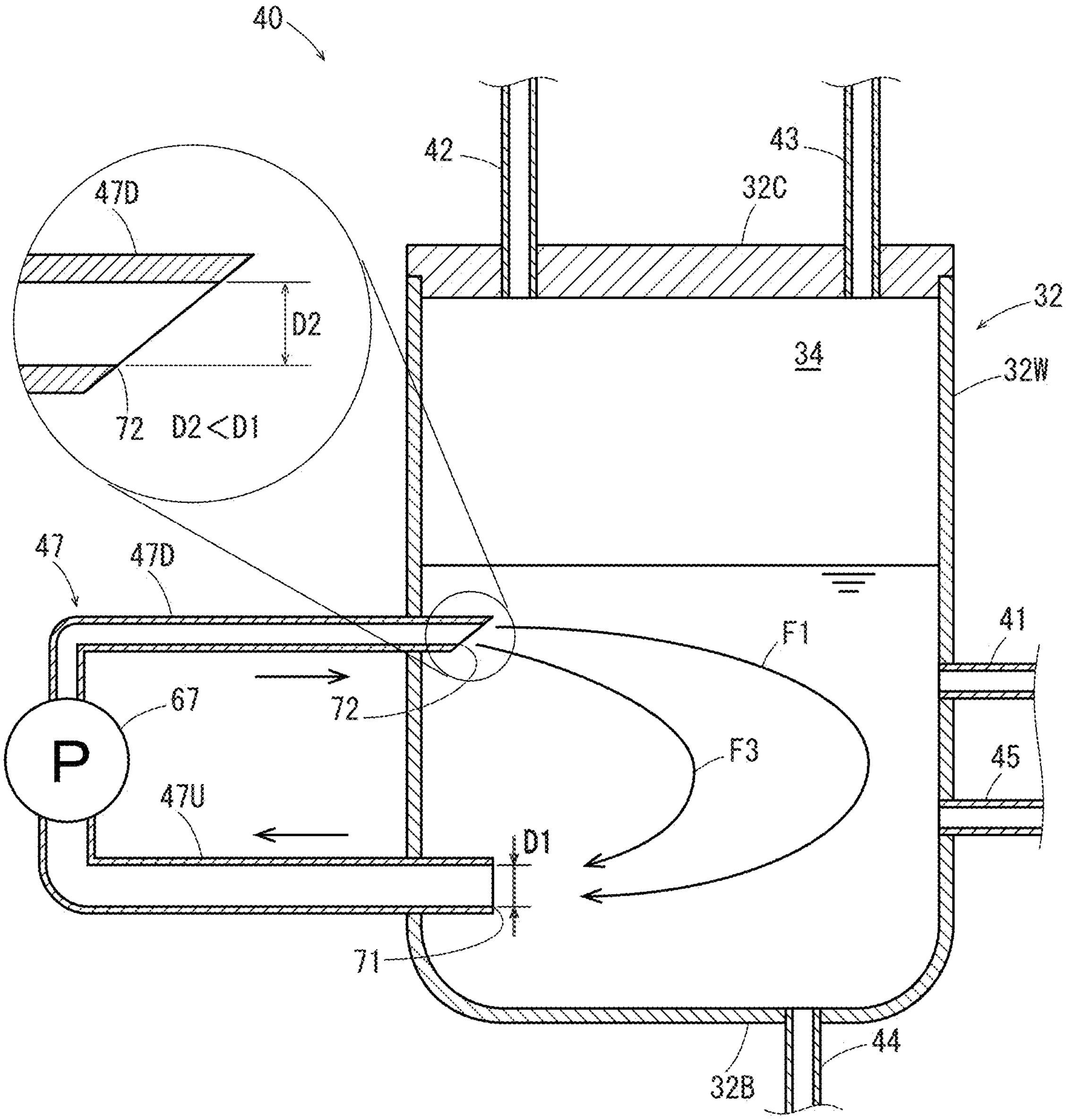
FIG. 7 is a sectional view showing the degassing device according to a second modified example of the embodiment of the present disclosure.

FIG. 7 is a cross-sectional view showing the degassing device 40 according to the second modified example of the above embodiment. In this modified example, the end surface of the inlet port 72 is inclined with respect to the liquid surface. Specifically, in the above embodiment, the end surface of the inlet port 72 is formed perpendicular to the liquid surface, but in the present modified example, the end surface of the inlet port 72 is formed obliquely downward with respect to the liquid surface. Therefore, the flow F1 of the above embodiment has a large horizontal component, but in the present modified example, since the obliquely downward flow F3 is added, the liquid can be circulated in a wider range than in the above embodiment.

[Additional Modified Example]

In the above embodiment, an example in which the degassing device 40 is provided in the inkjet recording apparatus 1 is shown, but the degassing device 40 can also be applied to devices used in other fields such as semiconductor manufacturing fields and display manufacturing fields. That is, it can be applied to degassing of chemical solutions, electrolytic solutions, liquid resins, adhesives, solvents, lubricating oils, liquid foods, serum, or the like, other than the ink.

In the above embodiment, an example in which the pressure decreasing pump 62 is used as a pressure decreasing device is shown, but the pressure decreasing device may be a device capable of reducing pressure in the ink tank 32, and for example, the pressure decreasing device may be an ejector.

In the above embodiment, an example in which the circulation pump 67 is used as a circulation device is shown, but the circulation device may be a device capable of circulating the ink through the circulation flow pass 47, and for example, the circulation device may be an ejector.

The invention claimed is:

1. A degassing device which removes air dissolved in liquid under a pressure decreased atmosphere, the degassing device comprising:
- a liquid tank in which the liquid is stored;
- a pressure decreasing device which decreases pressure in the liquid tank;
- a circulation flow pass which communicates different positions of the liquid tank; and
- a circulation device which circulates the liquid through the circulation flow pass, wherein
- the circulation flow pass includes:
- an outlet port from the liquid tank to the circulation flow pass; and
- an inlet port from the circulation flow pass to the liquid tank below a liquid surface, and
- a diameter of the inlet port is smaller than a diameter of the outlet port.

2. The degassing device according to claim 1, wherein,
- the circulation flow pass includes:
- an upstream side flow pass from the outlet port to the circulation device, and
- a downstream side flow pass from the circulation device to the inlet port, and
- a diameter of the downstream side flow pass is smaller than a diameter of the upstream side flow pass.

3. The degassing device according to claim 1, wherein,
- the downstream side flow pass includes a tapered portion whose diameter becomes smaller closer to the inlet port.

4. The degassing device according to claim 1, wherein an end surface of the inlet port is inclined with respect to the liquid surface.

5. An inkjet recording apparatus comprising:
the degassing device according to claim 1, and
a recording head which ejects the liquid degassed by the degassing device, to a sheet.

* * * * *